(12) United States Patent
Ballard et al.

(10) Patent No.: US 9,135,059 B2
(45) Date of Patent: Sep. 15, 2015

(54) OPPORTUNISTIC MULTITASKING

(75) Inventors: Lucia Ballard, San Francisco, CA (US); David W. Goodwin, Los Altos, CA (US); Joseph Sokol, Jr., San Jose, CA (US); Matthew G. Watson, San Francisco, CA (US); Neil G. Crane, San Francisco, CA (US); Cahya Masputra, San Jose, CA (US); Charles Srisuwananukorn, San Francisco, CA (US); Christopher Marcellino, San Francisco, CA (US); Scott Forstall, Los Altos, CA (US); Gregory Novick, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 12/959,284

(22) Filed: Dec. 2, 2010

(65) Prior Publication Data
US 2011/0252429 A1    Oct. 13, 2011

Related U.S. Application Data

(60) Provisional application No. 61/321,616, filed on Apr. 7, 2010.

(51) Int. Cl.
*G06F 9/46* (2006.01)
*G06F 3/00* (2006.01)
(Continued)

(52) U.S. Cl.
CPC .............. *G06F 9/485* (2013.01); *G06F 9/5011* (2013.01); *G06F 9/542* (2013.01)

(58) Field of Classification Search
CPC ...... G06F 9/4887; G06F 9/542; G06F 9/5011
USPC .................................. 718/103, 104; 719/318
See application file for complete search history.

(56) References Cited

U.S. PATENT DOCUMENTS

| 5,012,409 A | 4/1991 | Fletcher et al. |
|---|---|---|
| 5,410,543 A | 4/1995 | Seitz et al. |

(Continued)

FOREIGN PATENT DOCUMENTS

| CN | 101667208 A | 3/2010 |
|---|---|---|
| CN | 102298538 A | 12/2011 |

(Continued)

OTHER PUBLICATIONS

Hinckley et al. "Foreground and Background Interaction with Senor-Enhanced Mobile Devices." ACM Transactions on Computer-Human Interaction. vol. 12, No. 1. Mar. 2005. pp. 1-22.

(Continued)

*Primary Examiner* — Camquy Truong
(74) *Attorney, Agent, or Firm* — Fish & Richardson P.C.

(57) ABSTRACT

Services for a personal electronic device are provided through which a form of background processing or multitasking is supported. The disclosed services permit user applications to take advantage of background processing without significant negative consequences to a user's experience of the foreground process or the personal electronic device's power resources. To effect the disclosed multitasking, one or more of a number of operational restrictions may be enforced. By way of example, thread priority levels may be overlapped between the foreground and background states. In addition, system resource availability may be restricted based on whether a process is receiving user input. In some instances, an application may be suspended rather than being placed into the background state. Implementation of the disclosed services may be substantially transparent to the executing user applications and, in some cases, may be performed without the user application's explicit cooperation.

16 Claims, 6 Drawing Sheets

(51) Int. Cl.
*G06F 9/48* (2006.01)
*G06F 9/54* (2006.01)
*G06F 9/50* (2006.01)

(56) References Cited

U.S. PATENT DOCUMENTS

| | | | |
|---|---|---|---|
| 5,428,789 | A | 6/1995 | Waldron |
| 5,490,275 | A | 2/1996 | Sandvos et al. |
| 5,542,088 | A | 7/1996 | Jennings et al. |
| 5,694,604 | A | 12/1997 | Reiffin |
| 5,911,077 | A | 6/1999 | Anderson |
| 6,205,468 | B1 | 3/2001 | Diepstraten et al. |
| 6,260,150 | B1 | 7/2001 | Diepstraten et al. |
| 6,598,143 | B1 | 7/2003 | Baker et al. |
| 7,082,492 | B2 | 7/2006 | Pullela et al. |
| 7,313,419 | B2 | 12/2007 | Islam et al. |
| 7,383,463 | B2 | 6/2008 | Hayden et al. |
| 7,444,637 | B2 | 10/2008 | Pronovost et al. |
| 7,444,641 | B1* | 10/2008 | Diepstraten et al. ......... 718/107 |
| 7,457,484 | B2 | 11/2008 | Wakeland |
| 7,895,594 | B2 | 2/2011 | Kirilline et al. |
| 7,987,160 | B2* | 7/2011 | Brodie et al. ................ 707/690 |
| 8,112,755 | B2 | 2/2012 | Apacible et al. |
| 2004/0064816 | A1 | 4/2004 | Alverson et al. |
| 2005/0009505 | A1 | 1/2005 | Triebel |
| 2005/0026654 | A1 | 2/2005 | Perez et al. |
| 2005/0102650 | A1 | 5/2005 | Kalman |
| 2006/0008180 | A1 | 1/2006 | Wakeland |
| 2006/0106807 | A1 | 5/2006 | DeVitis et al. |
| 2007/0150759 | A1 | 6/2007 | Srinivasan et al. |
| 2007/0197196 | A1 | 8/2007 | Shenfield et al. |
| 2007/0264948 | A1 | 11/2007 | Jansson et al. |
| 2007/0299812 | A1* | 12/2007 | Salch ................................ 707/2 |
| 2008/0005736 | A1 | 1/2008 | Apacible et al. |
| 2008/0005738 | A1 | 1/2008 | Imai et al. |
| 2008/0022279 | A1 | 1/2008 | Jung |
| 2008/0062917 | A1 | 3/2008 | Oguchi |
| 2008/0189708 | A1 | 8/2008 | Cheng et al. |
| 2008/0239093 | A1 | 10/2008 | Easwar et al. |
| 2009/0028127 | A1* | 1/2009 | Walker et al. ................. 370/348 |
| 2009/0036108 | A1 | 2/2009 | Cho |
| 2009/0132754 | A1* | 5/2009 | Riska et al. ................... 711/103 |
| 2009/0204963 | A1 | 8/2009 | Swart et al. |
| 2009/0235255 | A1 | 9/2009 | Hu et al. |
| 2009/0286490 | A1 | 11/2009 | Chung |
| 2009/0305732 | A1 | 12/2009 | Marcellino et al. |
| 2009/0307696 | A1 | 12/2009 | Vales et al. |
| 2010/0172255 | A1* | 7/2010 | Cook et al. .................... 370/252 |
| 2010/0251263 | A1 | 9/2010 | Coelho et al. |
| 2011/0231854 | A1* | 9/2011 | Augenstein et al. ......... 718/103 |
| 2011/0249668 | A1 | 10/2011 | Van et al. |
| 2011/0252422 | A1 | 10/2011 | Rothert et al. |
| 2011/0252423 | A1 | 10/2011 | Freedman et al. |
| 2011/0252430 | A1 | 10/2011 | Chapman et al. |
| 2012/0122527 | A1 | 5/2012 | Fyke |

FOREIGN PATENT DOCUMENTS

| | | |
|---|---|---|
| DE | 112010005473.8 | 1/2013 |
| EP | 2556432 | 2/2013 |
| JP | 2006-209560 | 8/2006 |
| JP | 2007-316721 | 12/2007 |
| TW | 579466 | 3/2004 |
| TW | I255423 | 5/2006 |
| TW | 201135445 | 10/2011 |
| WO | WO2006003681 A1 | 1/2006 |
| WO | WO2007024035 A1 | 3/2007 |
| WO | WO2011126499 A3 | 4/2012 |

OTHER PUBLICATIONS

Chartier, David. "Lots to Like About New iPhone 2.2 Software Update (Updated)." Nov. 21, 2008. pp. 1-5. Accessed Aug. 26, 2010—http://arstechnica.com.

"Background Intelligent Transfer Service," Nov. 19, 2007, retrieved from the internet: URL:en.wikipedia.org/w/index.php?title=Background_Intelligent_Transfer_Service&oldid=172454784 [retrieved on Sep. 16, 2011].

"Division of Labor in Embedded Systems", by Ivan Goddard | Apr. 1, 2003, ACM Queue—Architecting Tomorrow's Computing, Apr. 1, 2003.

"Gizmodo: This Is Apple's Next iPhone", Sep. 8, 2010, retrieved from the internet: gizmodo.com/5520164/this-is-apples-next-iphone.

"Glossary", The Single UNIX® Specification, Version 2, (C) 1997, The Open Group, retrieved from the web at: pubs.opengroup.org/onlinepubs/007908799/xbd/glossary.html.

"iPhone 4G: is this it?" Sep. 8, 2010, retrieved from the internet: engadget.com/2010/04/17/iphone-4g-is-this-it/.

"Java Use in Mobile Information Devices; Introducing JTRON", Shouichi Hachiya, © 2001 IEEE.

"Sharing a File Descriptor Between Processes", by Thomas Fletcher, QNX Software Systems Ltd., retrieved from qnx.com/developers/articles/article_913_1.html on Jul. 9, 2012.

"Study Notes—GNU/Linux: the command line interface" DRAFT Version 0.9. Edited Feb. 25, 2004 [PDF] from wallawalla.edu, AA Aaby—cs.wallawalla.edu.

"The Webcam HOWTO—The Linux Documentation Project" © 2004-2005 Howard Shane, retrieved from the web at: ldp.org?HOWTO/html_single/Webcam-HOWTO/.

A "Bare-Machine" Implementation of Ada Multi-tasking Beneath the Linux Kernel[PDF] from psu.edu H Shen, A Charlet ...—Reliable Software Technologies-Ada- ..., 1999—Springer.

A multiprocessor kernel for active object-based systems P Muller—Modular Programming Languages, 2000—Springer.

A real-time systems context for the framework for information systems architecture[PDF] from psu.edu DJ Schoch ...—IBM Systems Journal, 1995—ieeexplore.ieee.org.

Andrew S. Tanenbaum: "Modern Operating Systems", 2001, Prentice Hall, upper Saddle River, NJ, USA, pp. 172-175.

Authorized officer Cora Garry, International Search Report and Written Opinion in PCT/US2010/049816, mailed Feb. 24, 2012.

BProc: The Beowulf distributed process space E Hendriks—Proceedings of the 16th international conference on ..., 2002—dl.acm.org.

Crosstalk—The Journal of Defense Software Engineering, Nov. 2003, vol. 16, No. 11. pp. 1-32.

Designing with Real-Time Kernels[PFD] from Bournemouth.ac.uk JJ Labrosse—Conference Proceedings of Embedded ..., 1997—dec.bournemouth.ac.uk.

Distributed Process Management Protocol for Transparent Remote Execution of Processes in a Cluster of Heterogeneous Unix Systems P Bepari—1999—Citeseer.

Dynamic resource allocation in multimedia applications[PDF] from tue.nlM van den Heuvel, I Tutor . . . —Master's thesis, Eindhoven ..., 2009—win.tue.nl.

Enforcing appropriate process execution for exploiting idle resources from outside operating systems Y Abe, H Yamada ... —ACM SIGOPS Operating Systems Review, 2008—dl.acm.org.

IBM(R) Distributed Computing Environment Version 3.2 for AIX(R) and Solaris: Application Development Guide—Core Components, retrieved from 01.ibm.com/software/network/dce/library/publications/appdev/html/APPDEV16.HTM on Jul. 9, 2012.

Inside Real-Time Kernels[PDF] from Bournemouth.ac.uk J Labrosse—Conference Proceedings of Embedded ..., 1997—dec.bournemouth.ac.uk.

Temporal control in real-time systems: Languages and systems[PDF] from upenn.edu S Fischmeister ...—Handbook of Real-Time Systems and ..., 2007—seas.upenn.edu.

Understanding the Linux kernel DP Bovet . . . —2006—books.google.com.

UNIX on a Micro-processor H Lycklama—Proceedings of the Jun. 13-16, 1977, national ..., 1977—dl.acm.org.

Xubuntu manual online, "display memory" command, retrieved Jul. 9, 2012 from manpages.ubuntu.com/manpages/precise/man7/display-memory.7.html.

(56) References Cited

OTHER PUBLICATIONS

Non-Final Office Action in U.S. Appl. No. 12/869,553, mailed Jul. 13, 2012, 19 pages.
Non-Final Office Action in U.S. Appl. No. 12/869,385 mailed Aug. 17, 2012, 26 pages.
Restriction Requirement in U.S. Appl. No. 12/869,518, mailed Jul. 25, 2012, 6 pages.
Non-Final Office Action in U.S. Appl. No. 12/869,566 mailed Sep. 28, 2012, 12 pages.
Dobjanschi, "Developing Android REST Client Applications," Retrieved from the Internet: ://dl.google.com/googleio/2010/android-developing-RESTful-android-apps.pdf> May 20, 2010, 56 pages.
Geetha, "Remote Service | Android Developer Tutorial (Part 9)" Sai Geetha's Blog—Android [online] Sep. 24, 2009 [retrieved on Sep. 16, 2013]. Retrieved from the Internet: < saigeethamn.blogspot.com/2009/09/android-developer-tutorial-part-9.html>, 4 pages.
Sharkey, "Forecast widget for Android 1.5 (with source!)," jsharkey.org [online], Apr. 24, 2009 [retrieved on Sep. 16, 2013]. Retrieved from the Internet: < jsharkey.org/blog/2009/04/24/forecast-widget-for-android-15-with-source/>, 5 pages.
Patent Examination Report No. 1 in Australian Application No. 2013205570 mailed Jun. 14, 2013, 4 pages.
U.S. Final Office Action for U.S. Appl. No. 12/869,518 dated Sep. 10, 2013, 32 pages.
Final Office Action in U.S. Appl. No. 12/869,566 mailed Jan. 28, 2013, 15 pages.
Final Office Action in U.S. Appl. No. 12/869,553, mailed Feb. 26, 2013, 24 pages.
Final Office Action in U.S. Appl. No. 12/869,385, mailed Mar. 7, 2013, 24 pages.
Non-Final Office Action in U.S. Appl. No. 12/869,518, mailed Mar. 15, 2013, 31 pages.
"Read-copy update", PE McKenney, J Appavoo, A Kleen, O Krieger . . . —2002—books.google.com, pp. 1-22.
Multitasking the Android Way, Apr. 28, 2010, Dianne Hackborn, retrieved from android-developers.blogspot.com/2010/04/multitasking-android-way.html.
Transforming policies into mechanisms with infokernel AC Arpaci-Dusseau, RH Arpaci-Dusseau . . . —ACM SIGOPS . . . , 2003—dl.acm.org.
Android version history, From Wikipedia, the free encyclopedia, retrieved from the web Feb. 12, 2013, pp. 1-25.
iOS: A visual history, by Dieter Bohn .theverge.com/users/Dieter%20Bohn) on Dec. 13, 2011, pp. 1-47.
Real-time data acquisition and feedback control using Linux Intel computers BG Penaflor, JR Ferron, DA Piglowski . . . —Fusion engineering and . . . , 2006—Elsevier.
Understanding the Linux 2.6. 8.1 CPU scheduler J Aas—Retrieved Oct. 2005—retep.googlecode.com.
Mobile Multitasking, David Quintana, retrieved from .davidquintana.com/entry/mobile-multitasking, Apr. 14, 2010.
Support for multitasking and background awareness using interactive peripheral displays B MacIntyre, ED Mynatt, S Voida, KM Hansen . . . —Proceedings of the 14th . . . , 2001—dl.acm.org.
Background data acquisition and carrying: the BlueDACS project T Wieland, M Fenne, B Stocker—Architecture of Computing Systems- . . . , 2006—Springer.
Thread coloring: a scheduler proposal from user to hardware threads M Gil, R Pinilla—ACM SIGOPS Operating Systems Review, 2005—dl.acm.org.
Android: A visual history, by Chris Ziegler .theverge.com/users/chrisziegler) on Dec. 7, 2011.
web.archive.org archive of developer.android.com, "Application Fundamentals", pp. 1-30, archived Feb. 28, 2009.
web.archive.org archive of developer.android.com, "Activity", pp. 1-58, archived Mar. 3, 2009.
web.archive.org archive of developer.android.com, "Manifest.permission", pp. 1-26, archived Feb. 21, 2009.
web.archive.org archive of developer.android.com, "Service", pp. 1-11, archived Feb. 25, 2009.
web.archive.org archive of developer.android.com, "Available Resource Types", pp. 1-24, archived Feb. 19, 2009.
web.archive.org archive of developer.android.com, "Notification", pp. 1-10, archived Feb. 18, 2009.
List of Android permissions, copyright © 2006 the Android Open Source Project, pp. 1-33, retrieved from the web at: ithub.com/android/platform__frameworks__base/blob/master/core/res/AndroidManifest.xml.
web.archive.org archive of developer.android.com, "BroadcastReceiver", pp. 1-8, archived Feb. 28, 2009.
web.archive.org archive of developer.android.com, "NotificationManger", pp. 1-3, archived Mar. 7, 2009.
web.archive.org archive of developer.android.com, "Intent", pp. 1-55, archived Mar. 29, 2009.
T-Mobile G1 Manual, Document Rev 08, Sep. 12, 2008, pp. 1-141.
"First Look: SIPDroid Open Source SIP Client for Android Mobile Phones", Posted by Cory Andrews on Apr. 28, 2009 in First Look, Mobile VoIP, VoIP News from oipsupply.com/blog.
"SipDroid—SIP Client for Android" from web.archive.org webpage of code.google.com, Mar. 27, 2009.
"devtcg: Push services: Implementing persistent mobile TCP connections", blog entry posted on Jan. 7, 2009.
Android Essentials by Chris Haseman, Paperback, 111 pages Published Jul. 1, 2008 by Apress.
Android Tips and Tricks for Better Multitasking, by Joe Levi, posted Feb. 4, 2010, pp. 1-3.
web.archive.org archive of developer.android.com, "ServiceState", pp. 1-8, archived Feb. 17, 2009.
web.archive.org archive of code.google.com, "Android.content.intent", pp. 1-50, archived Dec. 25, 2007.
web.archive.org archive of developer.android.com, "Intents and Intent filters", pp. 1-13, archived Mar. 3, 2009.
Research on mobile location service design based on Android X Shu, Z Du, R Chen— . . . and Mobile Computing, 2009. WiCom' . . . , 2009—ieeexplore.ieee.org.
Does Android dream with Intelligent Agents? J Aguero, M Rebollo, C Carrascosa, V Julian— . . . Symposium on Distributed . . . , 2009—Springer.
An introduction to android J Chen, D Advocate—Google I/O, 2008—stid.googlecode.com.
Mobile application security on Android J Burns—Black Hat'09, 2009.
Binary SMS: sending rich content to devices using SMS, posted by Julien Buratto on Mobiforge.com in 2007, pp. 1-8.
web.archive.org archive of wiki.java.net, "JainSIP", pp. 1-3, archived Mar. 28, 2007.
Stack.overflow.com posting of Jan. 2009 re JAVA SIP libraries, pp. 1-3.
web.archive.org archive code.google.com, "FAQ SipDroid", pp. 1-4, archived May 3, 2009.
SMS messages in Android, posted by Weimenglee on Mobiforge.com in Mar. 2009, pp. 1-18.
Wikipedia entry of Mobile VoIP, retrieved from the web Feb. 26, 2013, pp. 1-6.
Wikipedia entry of Session Initiation Protocol, retrieved from the web Feb. 26, 2013, pp. 1-10.
Wikipedia entry of Voice over IP, retrieved from the web Feb. 26, 2013, pp. 1-19.
Final Office Action in U.S. Appl. No. 12/869,553 mailed Apr. 15, 2013, 19 pages.
First Office Action in Chinese Application No. 201010570595.6 mailed Apr. 1, 2013, 25 pages.
"Android: How to release resources when the application terminates?", Stack Overflow.com posting of Jul. 1, 2009, retrieved from web.archive.org at http://web.archive.org/web/20100328100125/http://stackoverflow.com/questions/1068121/android-how-to-release-resources-when-the-application-terminates.
"Android: How to release resources when the application terminates?", Stack Overflow.com posting of Jul. 1, 2009, retrieved from the web on Sep. 5, 2014.

(56) References Cited

OTHER PUBLICATIONS

"Android Developers" (the Android Operating System developer reference website), Feb. 21, 2009, in WayBack Engine <URL: http://developer.android.com/index.html>, 2 pages.
Examiner Alexander Mason, Patent Examination Report No. 2 in Australian Application No. 2013205570 mailed Jun. 11, 2014, 4 pages.
Patent Examination Report No. 1 in Australian Application No. 2010350737 mailed Nov. 6, 2014, 4 pages.
U.S. Non-Final Office Action for U.S. Appl. No. 12/869,385 dated Sep. 10, 2014, 43 pages.
U.S. Non-Final Office Action for U.S. Appl. No. 12/869,518 dated Sep. 12, 2014, 41 pages.
U.S. Non-Final Office Action for U.S. Appl. No. 12/869,553 dated Sep. 11, 2014, 48 pages.
U.S. Final Office Action for U.S. Appl. No. 12/869,385 dated Jan. 7, 2015, 22 pages.
U.S. Final Office Action for U.S. Appl. No. 12/869,518 dated Jan. 7, 2015, 30 pages.
U.S. Final Office Action for U.S. Appl. No. 12/869,553 dated Jan. 5, 2015, 26 pages.
web.archive.org archive of developer.android.com, "DelayQueue", pp. 1-9, archived Mar. 23, 2009.
web.archive.org archive of developer.android.com, "ProcessInfo", pp. 1-5, archived May 14, 2009.
web.archive.org archive of developer.android.com, "Semaphore", pp. 1-13, archived Mar. 22, 2009.
web.archive.org archive of developer.android.com, "Lock", pp. 1-7, archived Mar. 4, 2009.
"Android operation system 1.5 r2," 2009, 27 pp. //wing-linux.sourceforge.net/sdk/1.5_r2/index.html, 27 pages.
U.S. Notice of Allowance for U.S. Appl. No. 12/869,566 dated Apr. 2, 2015, 22 pages.

* cited by examiner

OPPORTUNISTIC MULTITASKING

CROSS REFERENCE TO RELATED APPLICATIONS

This Application claims priority to U.S. Provisional Application Ser. No. 61/321,616 entitled "Opportunistic Multitasking" filed Apr. 7, 2010 and which is incorporated by reference in its entirety herein.

BACKGROUND

This disclosure relates generally to the field of computer science. More particularly, this disclosure relates to a technique for improving the user experience and power management in a personal electronic device.

Power constrained, hand-held devices (e.g., mobile phones, personal entertainment devices, and electronic pad computers) are resource limited compared to larger, fixed, systems such as desk-top, workstation and notebook computers. In such systems, the computational power available simply cannot support the execution of a large number of concurrent processes/threads without significantly degrading the user experience and consuming the device's limited power resources. In light of this recognition, system designers for these types of devices have traditionally permitted a limited multitasking capability at the operating system level (e.g., for core system functions), but have not supported multitasking at the user application level. While this approach has the benefit of minimizing the drain on the device's limited power resources, it also limits the ability to provide the user (via a user application) with an interactive environment.

SUMMARY

Services for a personal electronic device are provided through which a form of background processing or multitasking is supported. The disclosed services permit user applications to take advantage of background processing without significant negative consequences to a user's experience of the foreground process or the personal electronic device's power resources. Implementation of the disclosed services may be substantially transparent to the executing user applications and, in some cases, may be performed without the user application's explicit cooperation. To effect the disclosed multitasking, a number of operational restrictions may be enforced. A consequence of such restrictions may be that a process will not be able to do in background, what it may be able to do if it were in the foreground.

In one service, a foreground user application is transitioned to a non-executing state as it is moved out of the foreground state. In another service, a background process is given a maximum amount of time to complete a task before it is transitioned to a non-executing state. In still another service, audio applications (e.g., user applications generating or recording audio signals) are permitted to execute in background until, and unless, they are paused by a user. In yet another service, communication sockets instantiated for a user application may be maintained even if the user application instantiating same, is placed in a non-executing state (e.g., a voice over Internet Protocol user application). One illustrative type of application that can take advantage of this service is voice over Internet protocol (VOIP) user applications. In still other embodiments, user applications are permitted to receive notifications (e.g., location events) when in the non-executing state. Each of the disclosed services relies on or uses one or more restrictions that, in operation, can interfere with or prevent full-time multitasking operations. That is, the disclosed services permit multitasking only when it will not significantly interfere with the foreground process or unduly utilize the personal electronic device's power.

DETAILED DESCRIPTION

Services for a personal electronic device are provided through which a limited form of background processing or multitasking is supported. Use of one or more of the disclosed services, in combination with disclosed operating restrictions, permit user applications to execute in the background to give the user a robust interactive environment with little impact on the device's power resources. In some embodiments, background processing may be limited to the completion of a specific task, a specified amount of time (e.g., 5-30 minutes) or a particular type of task (e.g., audio operations). In other embodiments a user application may cease operation after notifying the operating system that it may be reanimated on the occurrence of one or more specified events. On reanimation, the application may perform additional operations in background. Implementation of the disclosed services may be substantially transparent to the executing user applications and, in some cases, may be performed without the user application's explicit cooperation.

As used herein, the phrase "personal electronic device" is a portable hand-held digital device such as a mobile phone, a personal digital assistant, a hand-held entertainment device, a pad or tablet computer system or a set top box (e.g., an Apple TV® or cable converter box). (APPLE TV is a registered trademark of Apple Inc.) As used herein, the term "service" refers to a utility, function or program code module that performs some task for a calling process, which has no user interface and which is accessed programmatically through a call interface such as an Application Programming Interface (API).

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in this specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

It will be appreciated that in the development of any actual implementation numerous programming and component decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the personal computational device development field having the benefit of this disclosure.

To effect background processing or multitasking without significant negative consequences to a user's experience of the foreground process or the personal electronic device's power resources, a number of operational restrictions may be enforced. A consequence of such restrictions may be that a process will not be able to do in background, what it may be able to do if it were in the foreground.

As used herein, the phrase "foreground process" means that process that currently has access to system resources (e.g., the platform's central processing unit and graphical processing unit) and presents a user interface (UI) or graphical user interface (GUI) to a user. (Accordingly, the "foreground" is a state in which a foreground process executes.) In contrast, a "background process" is a process that may be scheduled to access system resources but which does not currently present a UI/GUI to a user. (Accordingly, the "background" is a state in which a background process executes.) As used herein, the term "process" means a user application. A user application, in turn, is an executable code module(s) that is capable of presenting a UI/GUI.

Operational Restrictions:

The following illustrative list of operational restrictions may be enforced to limit the deleterious effect a background process may have on a foreground process.

1. Processor Scheduling.

Foreground and background processes may be assigned different processor scheduling "priorities" in such a way that background processes do not interfere with foreground processes. One of ordinary skill in the art will recognize that in operational environments such as UNIX and Mach, processes are not scheduled, threads are. (UNIX is a registered trademark of the American Telephone and Telegraph Company.) It will further be recognized that a thread is that portion of a program, application or process that can run independently of, and concurrently with, other portions of the program, application or process.

Figure 1:
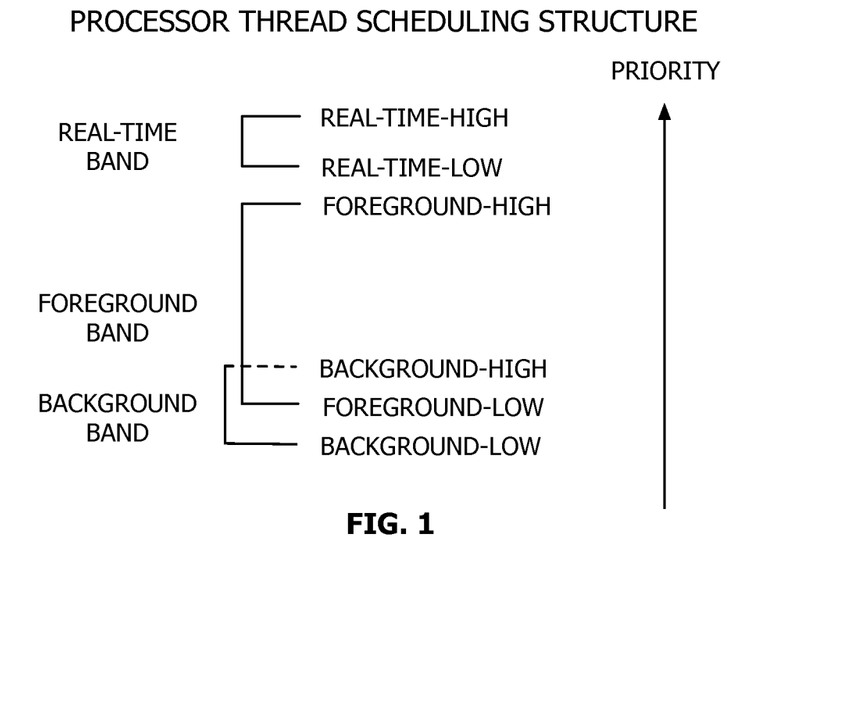
FIG. 1 shows an illustrative thread scheduling scheme in accordance with one embodiment.

Referring to FIG. 1, in one embodiment background threads may be assigned a priority from a band of priorities that overlaps in part with those priority levels assigned to foreground threads. The overlapping priority bands increase the likelihood that a background process/thread will make progress (i.e., execute) even when there is a foreground process/thread running. In this embodiment, to improve thread responsiveness it has been found beneficial to demote those threads (i.e., reduce their scheduling priority) that use their entire quantum without blocking for an input/output (I/O) operation. In one embodiment, a thread's priority is reduced by a single count every time it uses its full allotted quantum without blocking. (It will be recognized that a processes use of a full quantum is an indicator that the process is using the central processing unit.) In another embodiment, a thread's priority may be reduced by more than one count when this occurs. The amount of "overlap" in priority levels between the background band and the foreground band may be one (1) or more.

2. Disk Scheduling:

In one embodiment, foreground threads are given priority over background threads when accessing system storage units (e.g., magnetic hard drives and solid state hard disk units). In addition, background processes (i.e., threads associated with processes in the background state) may be rate-limited in their access of system storage units.

3. Incoming Network Activity.

In one embodiment, incoming network traffic may be moderated by dropping all packets destined for an application in the background or a non-executing state (e.g., suspended). Further, artificially small buffer sizes may be reported to distal network sites so as to throttle incoming TCP (Transmission control protocol) traffic. One of ordinary skill in the art will recognize that TCP has an existing set of traffic flow control mechanisms relating to buffer sizes, so that traffic isn't sent over a network faster than the recipient can handle it. As previously noted, in one embodiment artificially small buffer sizes may be reported so that the sender slows or stops the flow of incoming traffic.

4. Outgoing Network Activity.

In one embodiment, network access is mediated through the use of two (2) queues; one for jobs associated with foreground processes and one for jobs associated with background processes. It has been found beneficial to give the foreground queue priority over the background queue. By way of example, the foreground queue may be given 100% priority over the background queue. At this setting, the only time a job in the background queue will be serviced is if the foreground queue is empty. In another embodiment, jobs in the foreground queue may be serviced in any desired ratio with those from the background queue, e.g., 90/10, 80/20, 75/27 or 50/50. In still another embodiment, once a job has been placed into a queue (e.g., the foreground queue) it is not moved if the job's associated process is subsequently placed into a different operating state (e.g., background). In yet another embodiment, a job's queue location is updated to reflect the operational status of its associated process.

5. Graphics Operations.

In one embodiment such as, for example, the iPhone® Operating System, there are at least two mechanisms through which an application may write or paint to the display screen. (IPHONE is a registered trademark of Apple Inc.) A first mechanism is through the use of specialized hardware such as a graphics processing unit (GPU). A second mechanism is through use of one or more of the platform's central processing units (CPUs). By way of example, in the iPhone operating environment background processes are not permitted access to specialized graphics hardware; for example, any background process attempting to access the GPU may be terminated. By way of another example, background processes attempting to generate viewable graphics via the CPU are ignored—that is, any attempt to execute commands directed to using the CPU to write to a drawing buffer/memory are ignored. In some embodiments, drawing memory associated with a process/application placed into the background state may be marked as "purgeable." Thus, if a foreground process needs more memory it may use (through standard memory allocation techniques) display memory originally granted to a process that is now in the background state.

6. Notifications.

When a process transitions from the background state to the foreground state, it may be permitted to receive one (1) notification for each type of notification. More particularly, in one embodiment multiple notification events may be consolidated. For example, if a user rotates their personal electronic device (e.g., the iPhone) from portrait presentation to landscape presentation to portrait presentation and then back to landscape presentation, the resulting three (3) orientation notification events may be coalesced into a single notification—the last state, landscape. This can improve an application's response as it does not have to respond to multiple events. Illustrative notification types include orientation change notifications (for example, from accelerometer or gyroscope sensor input), address book database notifications (occurs when an address book entry is modified) and camera roll notifications (occurs when an image in a shared resource image library has been changed).

7. Locks.

In one embodiment, any process that has a lock on a shared resource that is going into the suspended state may be terminated (rather than suspended). Illustrative shared resources include specialized graphics hardware and file descriptors. In another embodiment, a shared resource is "taken away" from a user application when it goes into the background state. For example, if an application (process) has a lock on camera hardware, this lock is removed when the user application is placed into the background state. As used herein, the "suspended state" is a condition in which a process is not permitted to schedule threads for execution, but whose state is retained in main memory.

8. Hardware Restrictions.

In one embodiment background processes are prevented from gaining access to certain system hardware resources. Illustrative hardware not available to background processes include, but are not limited to: camera, GPU, accelerometer, gyroscope, proximity sensor and microphone.

9. Memory Management.

In order to retain sufficient memory to accommodate executing processes, as the personal electronic device's core memory approaches a specified "critical" point, processes may be removed from memory. In one embodiment, a process so removed may be hibernated. In another embodiment a process so removed may be terminated. As used herein, the phrase "core memory" or "main memory" means a personal electronic device's main random access memory from which user applications execute; a "hibernated process" is a process whose operational state has been written to non-volatile memory so that (1) it cannot schedule threads for execution and (2) its main memory "footprint" is substantially zero; and a "terminated process" is a process whose operational state has been deleted and which, therefore, cannot be executed until restarted. In one embodiment, during the act of hibernation memory which can be recreated (purgeable) or reloaded (clean) on demand is disposed of; only memory that has been modified or otherwise un-reconstitutable is written to non-volatile memory. In another embodiment, a specified region of non-volatile memory is set aside at boot time for use as a "hibernation" memory. When a hibernated process is reanimated, its data in non-volatile memory is brought back into main memory, thereby freeing up space in non-volatile storage. In one embodiment, applications not accessed for more than a specified time may be "hibernated."

Any desired approach for selection of which applications to remove from main memory may be made. For example, the least recently used application may be removed first. Alternatively, the largest currently non-executing application may be removed. In one embodiment, applications selected for removal that are greater than a specified size (e.g., 8 MB, 16 MB or 32 MB) may be terminated while applications less than the specified size may be hibernated. In still another embodiment, background audio user applications may be terminated only after suspended user applications have been terminated, but before foreground user applications.

Similarly, the "critical" point may be any value the designer wishes. Illustrative critical points include 50%, 75% and 90%. Using 75% as an exemplar critical point, applications would be selected for removal from main memory once the main memory reaches 50% of its capacity—for example, when a 256 megabyte (MB) main memory reaches 192 MB full.

Operational States:

As an aid in understanding how the above restrictions are applied to the various services described below, Table 1 identifies and describes five (5) operational states for a user process executing on a personal electronic device.

TABLE 1

Operational States

| Mode or State | Description | Restrictions |
|---|---|---|
| Foreground | A process in this state has access to system resources and currently presents a user interface to a user. | None. |
| Background | A process in this state has access to system resources but does not currently present a user interface to a user. | Real-time processes are subject to real-time restrictions (i.e., they are demoted to non-real-time priorities when placed into background—except for audio and VOIP/network communication's applications); all other processes are subject to all other restrictions. |
| Suspended | A process in this state has its operational state in main memory and could be scheduled for execution except for the fact that it has been suspended. | Not eligible for execution. |
| Hibernated | A process in this state has had its operational state written to non-volatile memory. Only that information necessary to identify, locate and reanimate the process is retained in main memory. | Not eligible for execution. |
| Terminated | A process whose operational state is no longer accessible in main memory. | Not eligible for execution. |

As used herein, the term "non-executing state" means one of the suspended, hibernated or terminated states.

Illustrative Services:

In the following, the "environment" within which the described services operate is the iPhone operating system. This is illustrative only, the disclosed services may be equally applicable to any personal electronic device.

1. Fast Task Switching Service.

In the past, when an application left the foreground state in the iPhone operating system, it was simply terminated. The Fast-Task Switching service permits an application to receive notification that it is leaving the foreground state and, at that time, is given an opportunity to do some processing (e.g., a few seconds). After this time, the application is suspended (i.e., placed into the suspended state). In one embodiment, an operating environment in accordance with this disclosure can apply Fast Task-Switching to all executing processes (unless making use of another service as described below). In another embodiment, each application must specify programmatically that it may be suspended.

While suspended a process/application can execute no instructions. In a threaded operating environment such as Unix or Mach, this means that a process cannot schedule a thread for execution. In some embodiments, however, kernel efforts initiated on behalf of a process may continue to execute even after the process itself has been suspended (or hibernated or terminated). Illustrative "kernel efforts" include in-progress I/O operations and virtual memory and network buffer operations. Completion of such operations may or may not trigger the reanimation of the suspended process.

It is noted that process suspension of the type discussed here is different from system-level operations such as prior art "sleep" or "hibernate" actions—both of which are "system-wide" operations. In accordance with the prior art, no process may execute while in the sleep or hibernate mode. In contrast, the suspend mode described herein applies to individual processes; suspension of a first process does not interfere with the execution of a second process.

2. Task Completion Service.

The Task Completion service provides a process with the limited ability to complete a task begun in the foreground state while in the background state. In one embodiment, background processes (i.e., processes executing in the background state) are throttled to avoid interfering with foreground processes. Illustrative tasks that are well suited to use this service are network upload and download operations, disk storage and retrieval operations and image processing operations (e.g., those operations that do not require specialized graphics hardware such as GPU). In one embodiment, a background process is permitted to continue processing (i.e., receiving CPU time in accordance with its scheduling priority as discussed above) until a specified event occurs. Illustrative events include a system timer (giving the process a specified amount of time to complete processing, e.g., 5 to 30 minutes of "clock time" or 5 millisecond of CPU time), loss of external power to the device, or activation of a primary or secondary display.

Figure 2:
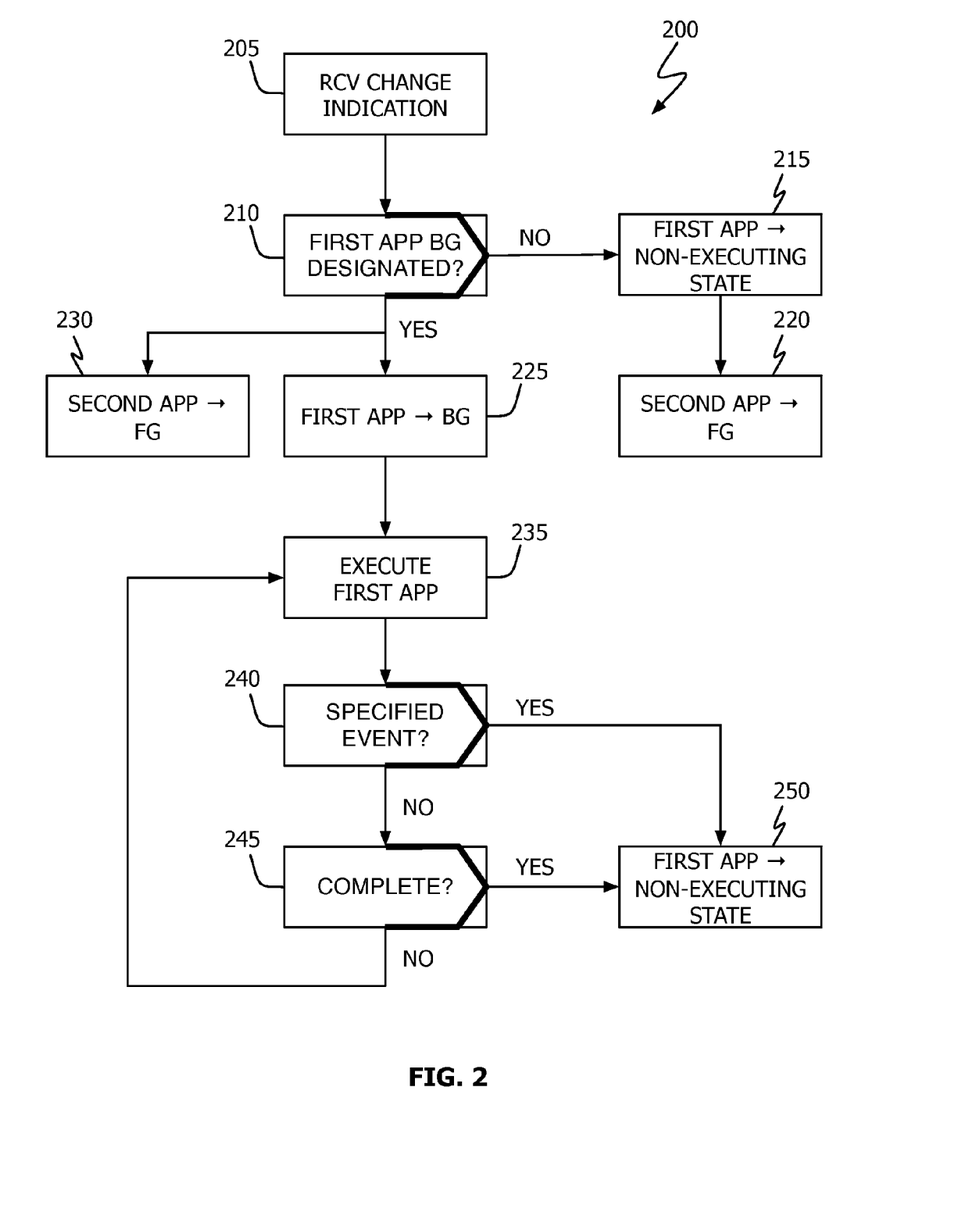
FIG. 2 shows, in flow chart form, a Task Completion service operation in accordance with one embodiment.

Referring to FIG. 2, illustrative Task Completion operation 200 begins when notice that a non-foreground user application (SECOND APP) is to be brought into the foreground (block 205). This may result from, for example, a user's request to start a second user application or an incoming call to a VOIP user application. If the currently foreground user application (FIRST APP) has not designated itself as an application capable of executing in background (the "NO" prong of block 210), FIRST APP is placed into a non-executing state (block 215) and SECOND APP is brought to the foreground (block 220). By way of example, FIRST APP may be suspended (i.e., placed into the suspended state). If FIRST APP has designated itself as an application capable of executing in background, such as though a p-list entry (the "YES" prong of block 210), FIRST APP is placed into the background state and given a specified amount of time to complete its current operation (block 225). SECOND APP may then be brought into foreground and permitted to execute (block 230). Once in background, FIRST APP may be scheduled to execute in due course (see discussion above regarding processor scheduling) (block 235). FIRST APP is permitted to execute in background until a specified event occurs (the "NO" prong of block 240) and it has not completed its task (the "NO" prong of block 245). Once either of the event occurs or the process completes its task (the "YES" prongs of blocks 240 and 245), FIRST APP may be placed into a non-executing state; for example, the suspended or terminated state.

In one embodiment, non-active foreground processes may be similarly limited in their ability to access full system resources. For example, one or more non-active foreground processes (i.e., a foreground process not currently receiving user input) may have their access to storage disks (restriction 2), incoming and outgoing network buffers (restrictions 3 and 4) and their ability to interact with specified hardware (restriction 8) limited in the same manner as described here for background processes. In like manner, on power loss all foreground processes except the active foreground process may be "pushed" into the background, where their behavior is thereafter controlled in accordance with the background processing regime described here.

In one embodiment, a process must declare programmatically that it wants to avail itself of the Task Completion service (e.g., during acts in accordance with block 210). This may be done, for example, by statically declaring the user application can avail itself of the Task Completion service though an API call, a p-list entry or a changeable setting specified by the user at install time or first run rime. In another embodiment, task completion is granted based on an application declaring, at run time and in code, that it is beginning an operation (then subsequently declaring that it has ended that operation). If such tasks are still outstanding when the application leaves the foreground state, the application may be granted some time to complete them. On occurrence of the specified event, or sooner if the task(s) completes, the application may be suspended. In yet another embodiment, any process or user application executing one of a specified number of eligible tasks may avail itself of the Task Completion service (e.g., one of the aforementioned operations). For example, any process executing a file upload or download operation could be placed into background in accordance with Task Completion service restrictions.

3. Audio Service.

The Audio service permits a process or application to play or record audio while in the background state. In one embodiment, audio processes utilize real-time threads and are scheduled accordingly (See FIG. 1). While real-time processes are, in general, demoted to a non-real-time priority when placed into background, this is not true for an application using the Audio service (see discussion above). Because the described embodiments utilize real-time threads for audio applications, to minimize interference with foreground processes only one real-time audio process at a time may be allowed in background state. (It will be recognized that this number is merely illustrative. If the processing power of the personal electronic device is sufficient, multiple audio processes may be active in the background at the same time.)

Figure 3:
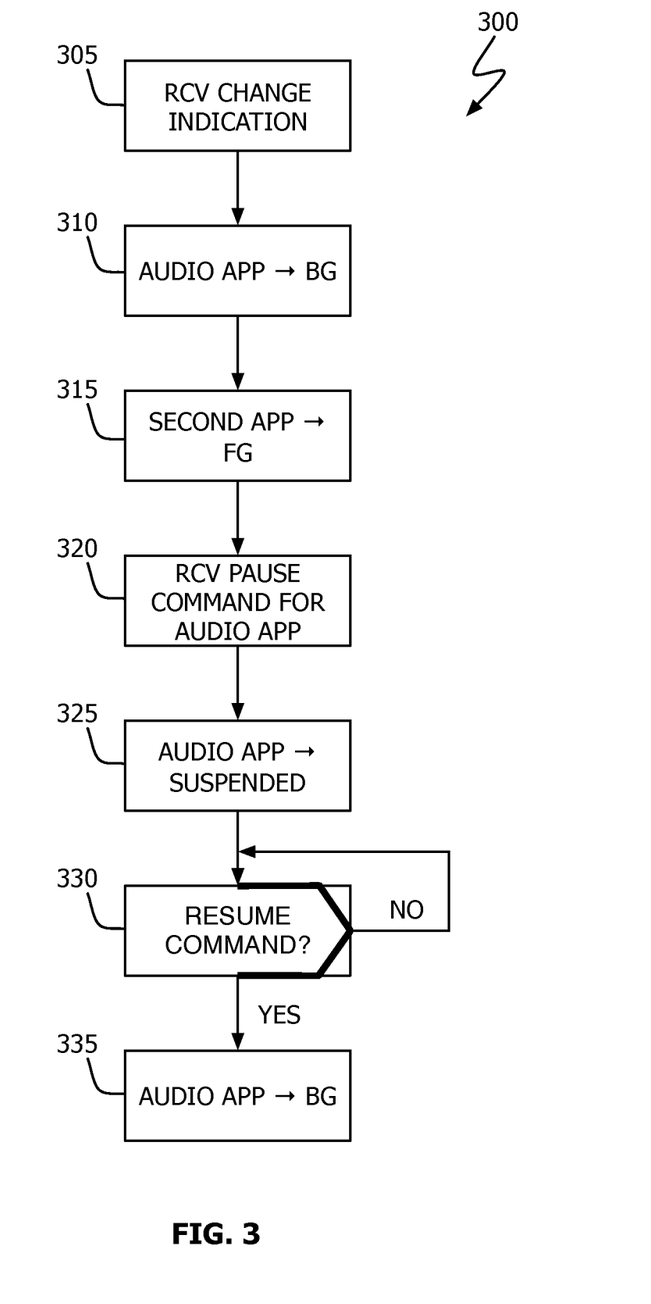
FIG. 3 shows, in flow chart form, an Audio service operation in accordance with one embodiment.

Referring to FIG. 3, illustrative Audio service operation 300 begins when a foreground user application executing an audio operation (e.g., music playback or voice recording operations) receives notice that another user application not currently in the foreground (SECOND APP) is to be brought into the foreground (block 305). The user's audio application is then placed into background (block 310) and the SECOND APP is brought into foreground (block 315). In one embodiment, real-time background threads may be limited to execute from a specified set of libraries. For example, real-time background threads may be prevented from using third party libraries (e.g., libraries supplied by an application developer). At some point in the future, the user may issue a "pause" command to their background audio application (block 320). In response, the user's background audio application is moved from the background state to the suspended state (block 325). The audio application is kept in the suspended state until the user issues a "resume" command (the "YES" prong of block 330), after which the audio application is moved back into the background state where it may continue to execute it's audio operation (block 335). In another embodiment, the audio application may be placed into the hibernate mode rather than the suspended mode.

In some embodiments, a process may statically declare it can avail itself of the Audio service though an API call, a p-list entry or a changeable setting specified by the user at install time or first run rime. In other embodiments, any process either playing or recording audio may have the Audio service applied to it. When executing code within these applications, the associated process could not be suspended during audio operations in accordance with the Fast Task-Switching or Task Completion services.

4. Notification Service.

The Notification service permits a process, in whatever state (foreground, background, suspended or hibernated), to receive and respond to messages. These messages may originate from an external source (a "push" notification) or the receiving process/application itself ("local" notification).

Generally speaking, on message receipt an operating system module (e.g., the "Springboard" application in the iPhone operating system) identifies the target application (i.e., that application the notification message is directed towards), launches that application in background and passes the message to the now reanimated application. In another embodiment, on message receipt the operating system (e.g., Springboard) generates a dialog box through which the user can elect to switch to the target application (i.e., the application to which the notification message is directed). If so elected, the target application is brought into foreground. (It will be recognized that if the target application is already in the background, it need not be reanimated.) The application is thereafter given an opportunity to respond to the message, including presenting a dialog to a user through, for example, an operating system request. Control of the receiving process is then provided in accordance with the relevant service (e.g., Fast Task Switching, Task Completion, Audio, VOIP or Location and Geo-Fencing). In another embodiment, notifications destined for a background process may be queued up and delivered at a later time (e.g., every 5 minutes) rather than being delivered substantially immediately after notification receipt.

5. Network Service.

The Network service permits a suspended network application to maintain (i.e., keep alive) its communication socket(s). As used herein, a network application is a user application that uses network communication sockets. An illustrative network application is a user VOIP application. In the prior art when a user's network application/process is suspended, it loses its ability to maintain its communication socket(s) and, as a result, cannot continue to receive communication data (e.g., an incoming VoIP phone call).

Figure 4:
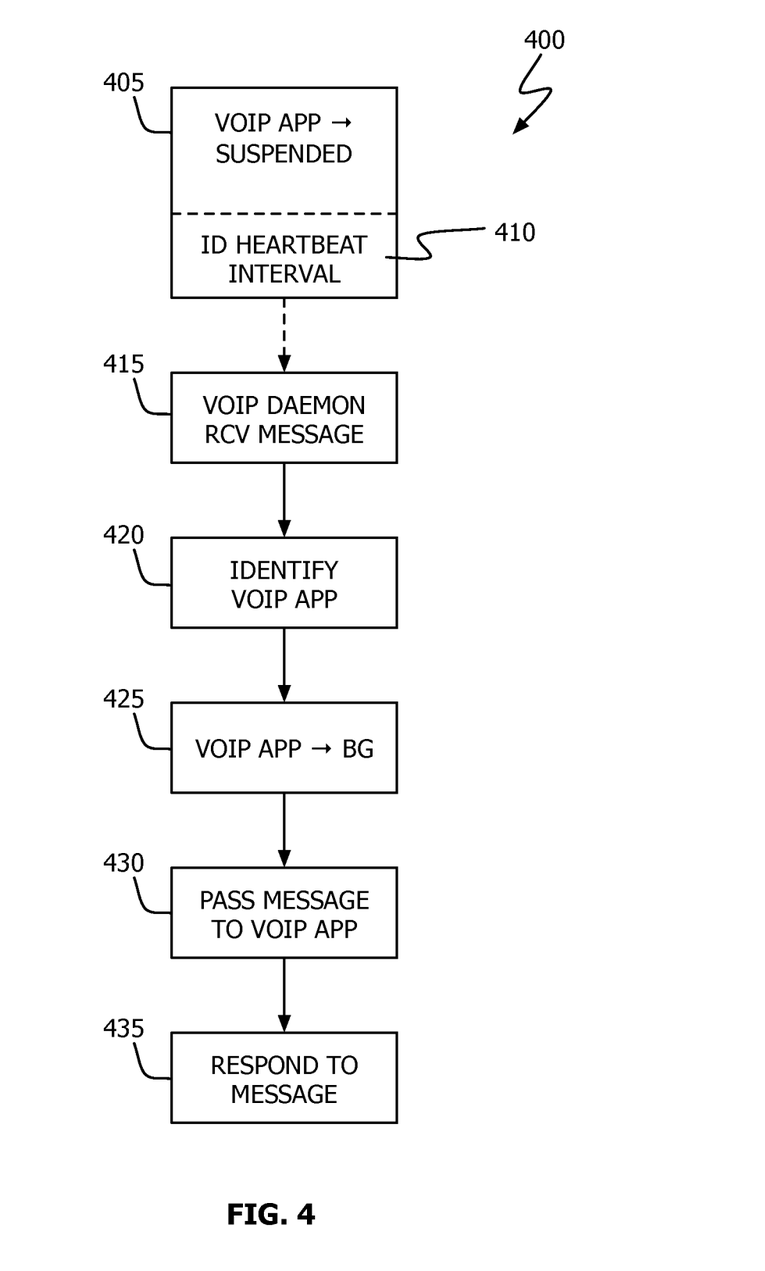
FIG. 4 shows, in flow chart form, a VOIP service operation in accordance with one embodiment.

Referring to FIG. 4, an illustrative Network service operation is demonstrated by VOIP service operation 400 which begins with a user's VOIP application being transitioned into the suspended state (block 405). In one embodiment, as a VOIP process is being transitioned into the suspended state it specifies to the operating system (e.g., to a network daemon) what time interval it requires for the sending of "heartbeat" messages (410). This daemon is responsible for reanimating the process when data is received at the processes associated socket(s) or on expiration of the specified time—the latter for heartbeat maintenance. For more information on this aspect, see U.S. Patent Publication 20090305732 entitled Managing Notification Service Connections and Displaying Icon Badges. Such application being incorporated in its entirety herein.

At some later time, the network daemon receives a message (block 415). The target application is then identified (block 420), reanimated into the background state (block 425) and passed the message (block 430). The background VOIP application may then respond to the message (e.g., an incoming VOIP call or a "heartbeat needed" message) (block 435). If the needed task was to issue a heartbeat, the VOIP application may be returned to the suspended state. If the needed task was to respond to an incoming VOIP call, the VOIP application may request the operating system issue a UI so that a user may select whether to accept or ignore the call. If the call is ignored, the VOIP application may be returned to the suspended state. If the call is to be answered, the VOIP application may be brought to the foreground (e.g., by means of the user selecting the appropriate element in a UI presented by the operating system). While it will be recognized that operating system daemons are well-known in the art, the maintenance of network communication (e.g., VOIP and wireless fidelity or WiFi) sockets for a suspended process in a personal electronic device of the type described herein is novel.

6. Location and Geo-Fencing Service.

The Location and Geo-Fencing service permits a background or suspended process to receive notice (e.g., a message from on operating system daemon) when a specified location event occurs. Illustrative location events include, but are not limited to, arriving at a specified location, leaving a specified location, entering a specified region, leaving a specified region or moving a "significant" distance (where what constitutes "significant" can be specified by the user or the user application). In one embodiment, a process/application must declare programmatically that it wants to avail itself of the Location and Geo-Fencing Operation service (e.g., via a p-list parameter). In another embodiment, Geo-Fencing operations do not require the use of a p-list entry—all Geo-Fencing applications may avail themselves of the Geo-Fencing service.

In location operations, as long as a location tracking operation is underway, the application may be kept in background—receiving processing time in accordance with system scheduling mechanisms (see discussion above). In one embodiment, when a tracking operation either terminates or is otherwise halted, the process may be suspended (i.e., placed into the suspended state; the process could also be terminated or hibernated). Once the process responds to the message, it may quiesce (returning to the suspended state) or block in the background state awaiting the next message. In one embodiment the number of user applications using Location services in the background state relates to the usage of other system resources; for example, if system memory runs low, user applications currently performing location tracking may be terminated. In another embodiment, a centralized daemon aggregates all of the location requests (particularly with respect to the desired accuracy requested), and starts appropriate hardware for the most aggressive mode requested. For example, if one user application requests the user's location to within 3 kilometers (in which case mobile phone cell-based positioning may be used), a second user application requests the user's location to within 500 meters (in which case WiFi scanning may be used), and a third application requests the user's location to within 100 meters (for which GPS is necessary), GPS positioning may be used and all applications that are tracking location in the background will get the benefit of the finer positioning.

In geo-fencing operations, whenever a specified region boundary is crossed the process receives a message from the operating system (e.g., via a daemon). If the process is executing (e.g., during its allocated time while in background), it would be given the opportunity to process the message. If the application were not processing (e.g., it was in background and not processing or it was suspended or hibernated), the process/application would be reanimated after which it would be allowed to process the event (in background). In addition, if the process had been terminated, it may be reanimated into the background state in a manner similar to the Notification service described earlier. See the related disclosure entitled "Location-Based Application Program Management," Ser. No. 12/123,456. In an embodiment where location processing uses a separate processor than that which executes the operating system for user application execution (hereinafter referred to as the "application processor"), location and geo-fencing operations of the type described here may occur even when the application processor is asleep. As with Location services, the number of user applications that may avail themselves of Geo-Fencing services in the background state relates to the usage of other system resources; for example, if system memory runs low, user applications currently performing location tracking may be terminated.

Figure 5:
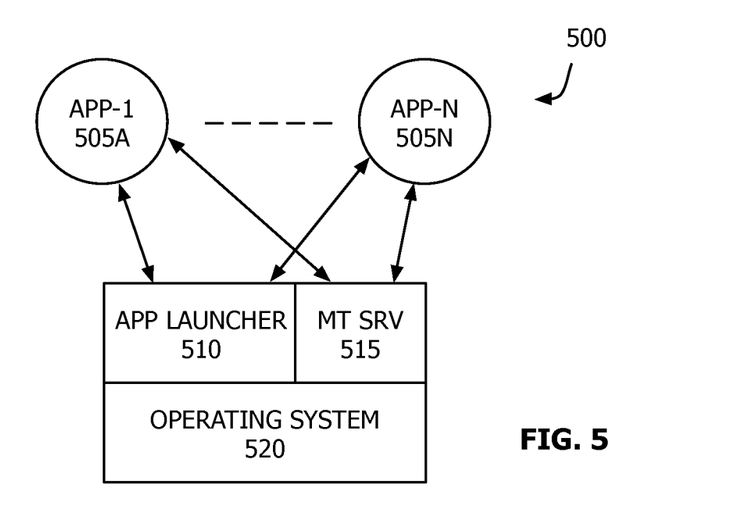
FIG. 5 shows, in block diagram form, a personal electronic device in accordance with one embodiment.

Personal Electronic Device Architecture:

Referring to FIG. 5, in one embodiment personal electronic device 500 could implement one or more of the above services using one or more of the above-described restrictions to permit multitasking operations when it is beneficial to do so (e.g., opportunistic multitasking). As illustrated, user applications 505A to 505N interact with application launcher 510 (e.g., "Springboard" in the iPhone operating system) for standard operating system calls and multitasking services library 515 to access and make use of the above-described services.

Figure 6:
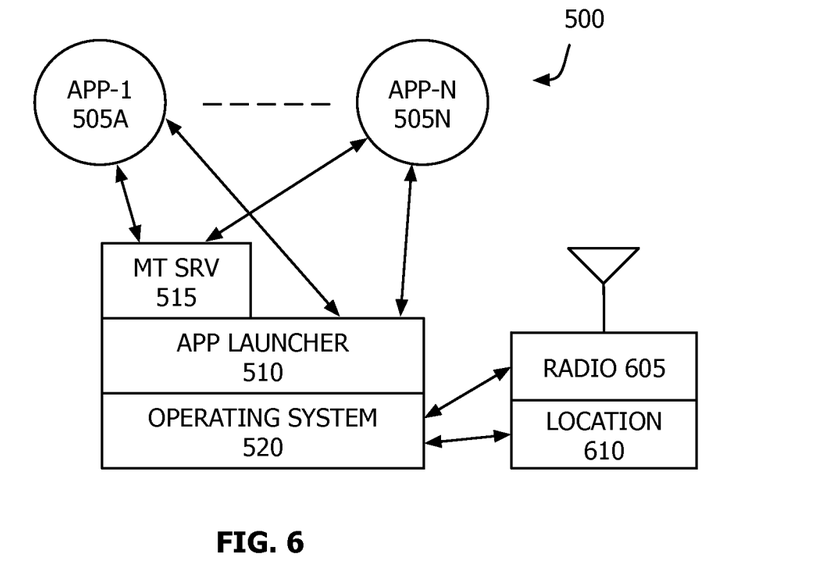
FIG. 6 shows, in block diagram form, a personal electronic device in accordance with another embodiment.
Figure 7:
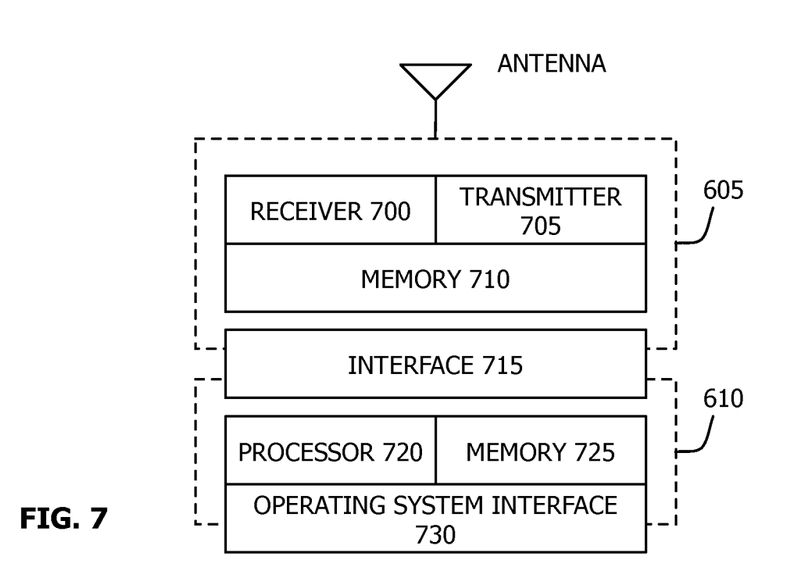
FIG. 7 shows, in block diagram form, radio and location processing elements in accordance with one embodiment.

Referring to FIG. 6, system 600 in accordance with another embodiment could also include radio means 605 and location processing means 610. As shown in FIG. 7, radio means 605 may include receiver circuit 700, transmitter circuit 705 and memory 710. Receiver and transmitter circuits 700 and 705 may be used to connect to, for example, a mobile telephone network, a satellite communications network or a digital computer network (e.g., the Internet via a local area network WiFi connection). Memory 710 may be used to store received data, data to be transmitted and operational parameter information as is known in the art. Interface 715 may be provided to facilitate communications between radio means 605 and location means 610. Location means 610 may include processor 720, memory 725 and operating system interface 730. In general, location means 610 receives requests for location updates and geo-fencing limits (e.g., from one or more user applications 505A to 505N through interface 730), processes location information received from radio means 605 (received via interface 715) and returns location information and updates to the requesting application(s) through interface 730. Processor 720 may be one or more off-the-shelf processors, one or more custom designed processors or a combination of off-the-shelf and custom designed processors. Memory 725 may be any form or combination of volatile and non-volatile solid state, magnetic or optical memories.

In one embodiment, one or more of the described services may be provided based on the availability of power. For example, if the personal electronic device is plugged into a power source (e.g., AC power), multitasking capabilities may be provided in accordance with standard modern operating system procedures (i.e., full or unrestricted multitasking). If, on the other hand, the personal electronic device is not plugged into a power source, multitasking capabilities may be provided in accordance with this disclosure (e.g., partial or opportunistic multitasking).

Figure 8:
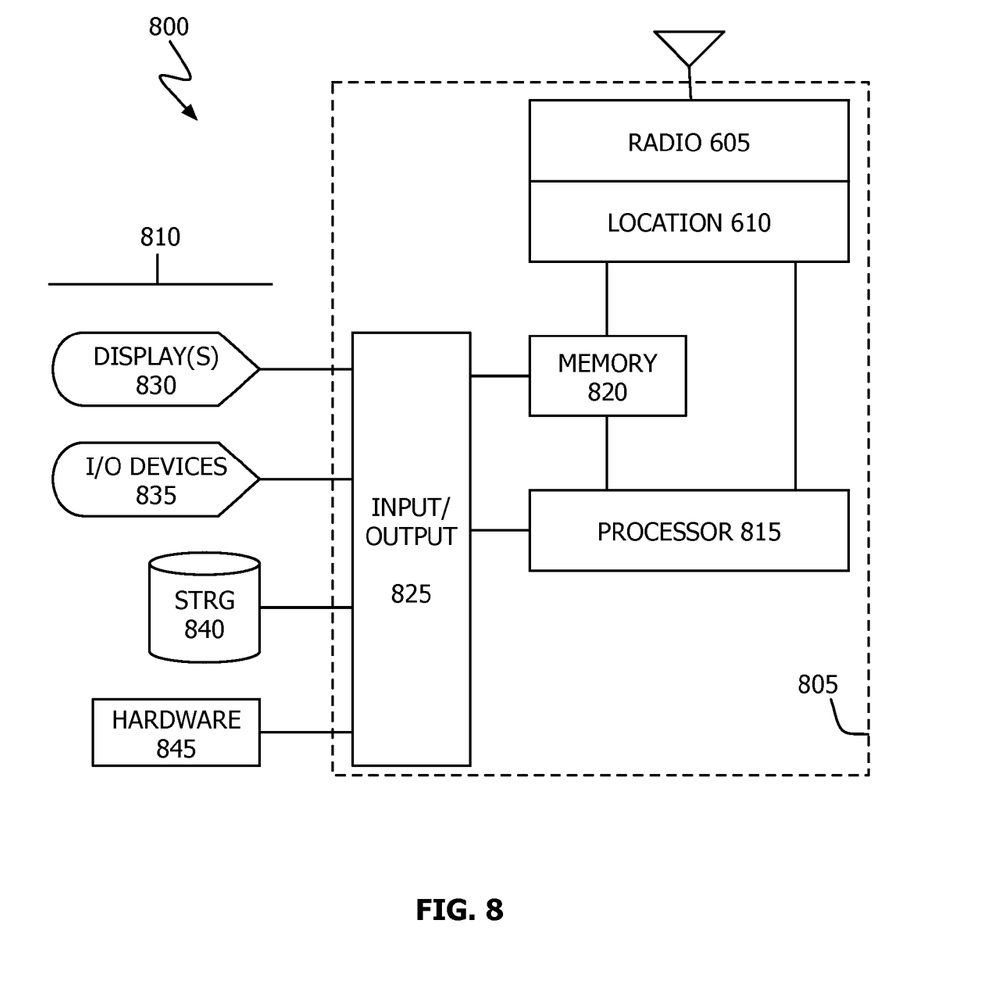
FIG. 8 shows, in block diagram form, a personal electronic device in accordance with one embodiment.

Referring to FIG. 8, personal electronic device 800 may be embodied in a physical apparatus that includes processing unit 805 and support devices 810. Processing unit 805 may include processor 815, memory 820 and input-output circuit 825. Device 800 may also include radio means 605 and location means 610 as shown. Input-output circuit 825 couples processor 815 and memory 820 to one or more display units 830 (e.g., a touch-screen display), one or more input-output devices 835 (e.g., touch-screen, keyboard, mouse, joy stick), one or more program storage devices 840 (e.g., magnetic, optic or solid-state memory) and other hardware 845 (e.g., a network interface). It is noted that in the architecture presented in FIGS. 2, 6 and 7 location and geo-fencing processing may continue via radio means 605 and location means 610 even when/if the application making the location or geo-fencing request (e.g., application 505A) has been suspended, hibernated or terminated. Further still, location and geo-fencing operations may continue even if application processor 815 is hibernated. That is, location and geo-fencing operations may continue via processor 720 regardless of what state application processor 815 is in.

Various changes in the materials, components, circuit elements, as well as in the details of the illustrated operational methods are possible without departing from the scope of the following claims. For instance, the provision of multitasking capabilities in accordance with this disclosure may be performed by a programmable control device executing instructions organized into one or more program modules. A programmable control device (e.g., processors 720 and 215) may include any programmable controller device including, for example, one or more members of the Intel Atom®, Core®, Pentium® and Celeron® processor families from Intel Corporation and the Cortex and ARM processor families from ARM or custom designed state machines. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Custom designed state machines may be embodied in a hardware device such as an integrated circuit including, but not limited to, application specific integrated circuits ("ASICs") or field programmable gate array ("FPGAs").

Storage devices suitable for tangibly embodying program instructions (e.g., memories 710, 725, 220 and 240) include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:
   scheduling a first foreground process with a scheduling priority from a first band of priority levels;
   scheduling, based on the scheduling a first foreground process with a scheduling priority from a first band of priority levels, a first background process with a scheduling priority from a second band of priority levels;
   associating, with at least one of the first foreground process and the first background process, an allotted quantum of one or more specified system resources; and
   adjusting the scheduling priority of one of the first foreground process and the first background process in response to one of the first foreground process and the first background process using a full amount of the allotted quantum of one or more specified system resources by the one of the first foreground process and the first background process,
   wherein the priority levels in the first band and the second band overlap by one, but not all, priority levels.

2. The method of claim 1, further comprising scheduling a third process with a priority from a real-time priority band, wherein all priority levels in the real-time priority band are greater than all priority levels in the first band.

3. The method of claim 2, wherein the scheduling a third process comprises scheduling a background process.

4. The method of claim 1, wherein the one or more specified system resources are selected from a group including a camera, a graphics processing unit, an accelerometer, a proximity sensor, and a microphone.

5. The method of claim 1, wherein the adjusting the scheduling priority of one of the first foreground process and the first background process includes reducing the scheduling priority of the one of the first foreground process and the first background process by a single count.

6. The method of claim 1, wherein the adjusting the scheduling priority of one of the first foreground process and the first background process includes reducing the scheduling priority of the one of the first foreground process and the first background process by more than one count.

7. The method of claim 1, wherein the first background process is rate-limited in accessing system storage.

8. The method of claim 1, wherein the first foreground process is given priority over the first background process when the first foreground process accesses system storage.

9. A non-transitory program storage device, readable by a programmable control device, comprising instructions stored thereon for causing the programmable control device to perform a method, comprising:
   scheduling a first foreground process with a scheduling priority from a first band of priority levels;
   scheduling, based on the scheduling a first foreground process with a scheduling priority from a first band of priority levels, a first background process with a scheduling priority from a second band of priority levels;
   associating, with at least one of the first foreground process and the first background process, an allotted quantum of one or more specified system resources; and
   adjusting the scheduling priority of one of the first foreground process and the first background process in response to one of the first foreground process and the first background process using a full amount of the allotted quantum of one or more specified system resources by the one of the first foreground process and the first background process,
   wherein the priority levels in the first band and the second band overlap by one, but not all, priority levels.

10. The program storage device of claim 9, further comprising scheduling a third process with a priority from a real-time priority band, wherein all priority levels in the real-time priority band are greater than all priority levels in the first band.

11. The program storage device of claim 10, wherein the scheduling a third process comprises scheduling a background process.

12. The program storage device of claim 9, wherein the one or more specified system resources are selected from a group including a camera, a graphics processing unit, an accelerometer, a proximity sensor, and a microphone.

13. The program storage device of claim 9, wherein the adjusting the scheduling priority of one of the first foreground process and the first background process includes reducing the scheduling priority of the one of the first foreground process and the first background process by a single count.

14. The program storage device of claim 9, wherein the adjusting the scheduling priority of one of the first foreground process and the first background process includes reducing the scheduling priority of the one of the first foreground process and the first background process by more than one count.

15. The program storage device of claim 9, wherein the first background process is rate-limited in accessing system storage.

16. The program storage device of claim 9, wherein the first foreground process is given priority over the first background process when the first foreground process accesses system storage.

* * * * *